J. L. SPENCE, Jr.
SCRAPER.
APPLICATION FILED APR. 13, 1922.
1,432,798.
Patented Oct. 24, 1922.
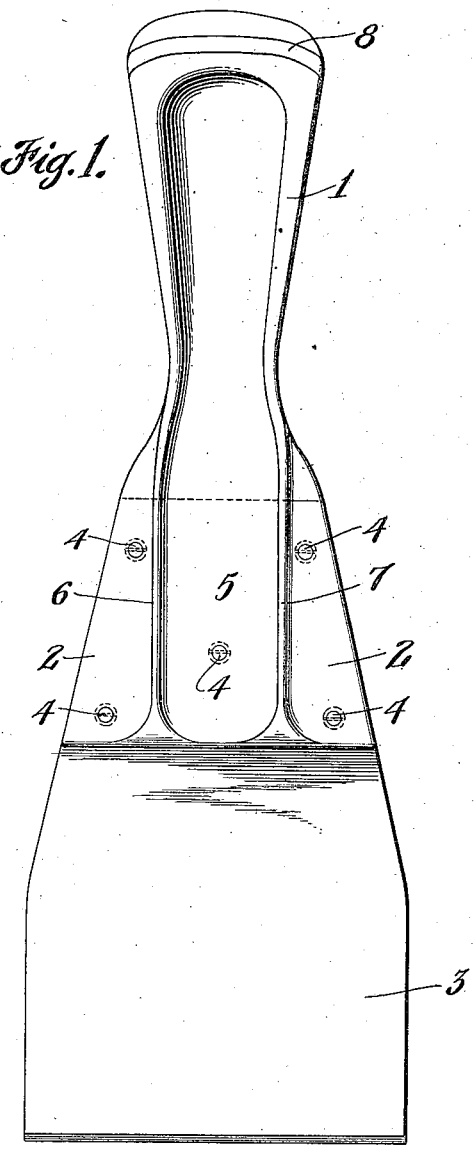
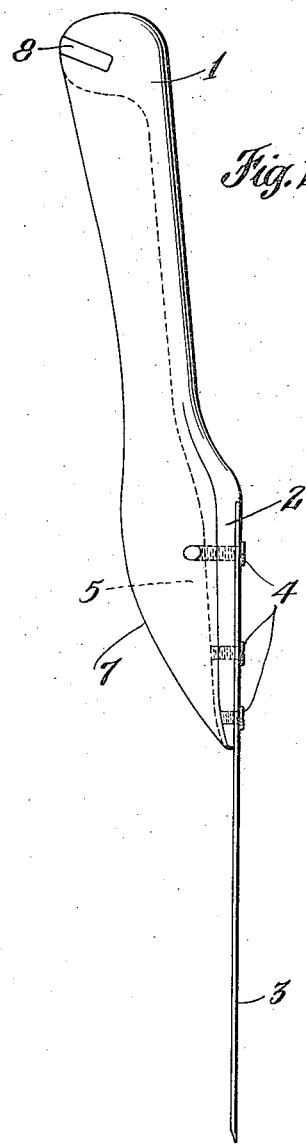
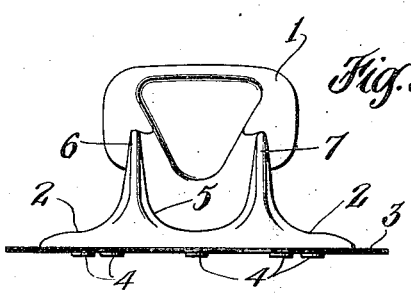
INVENTOR
JOHN LIVINGSTON SPENCE, JR.
BY
ATTORNEYS Patented Oct. 24, 1922.

1,432,798

UNITED STATES PATENT OFFICE.

JOHN L. SPENCE, JR., OF BROOKLYN, NEW YORK.

SCRAPER.

Application filed April 13, 1922. Serial No. 552,142.

*To all whom it may concern:*

Be it known that I, JOHN L. SPENCE, Jr., a citizen of the United States, and a resident of the borough of Brooklyn, city and State of New York, have invented certain new and useful Improvements in Scrapers, of which the following is a specification.

My invention relates to an improvement in hand scrapers for scraping paper, paint, paste, etc., from walls, woodwork, billboards and the like.

One of the objects of my invention is the provision of a handle for the scraper so constructed and arranged with respect to the blade of the scraper that the material being removed will be deflected from encountering the hand of the operator.

Another object of my invention is the provision of a relatively resilient material in the handle of the scraper which will prevent the slipping of the hand of the operator when the scraper is in use.

A further object of my invention is the provision of an offset handle for preventing the knuckles of the operator from coming in contact with the surface being scraped.

A still further object of my invention is the provision of a blade removably attached to the handle so as to be readily removed from the handle for repair or replacement.

Further objects of my invention will be manifest from the following description of the accompanying drawing, in which drawing—

Fig. 1 is a plan view of a scraper constructed in accordance with my invention;

Fig. 2 is a side view thereof; and

Fig. 3 is a front view of the same.

Referring to the drawing in detail,—1 designates a handle for the scraper which handle is provided with a flattened portion 2 at one end thereof. To the underside of this flattened portion 2 is removably secured a blade 3, the blade being held to the handle by any suitable means such as screws 4. Of course it will be understood that the blade 3 may be permanently secured to the handle if desired but I prefer to secure the same thereto by screws, bolts or other means whereby the blade may be readily removed for replacement or repair.

The handle has formed therein, in the upper side, that is to say at the side opposite to the portion 2, a longitudinal groove 5 for the reception of the fingers or thumb of the operator. The upper edges 6 and 7 of this groove are inclined as will be seen from Fig. 2, constituting a guard for deflecting the paper or other material being removed away from the operator's hand, thereby preventing cutting of the hand.

It will be noted from an inspection of Fig. 2 that the handle 1 is offset with respect to the blade 3. This arrangement prevents the knuckles of the operator from coming in contact with the surface being scraped.

A piece of leather, fibre, rubber or other suitable material 8 is inserted in the upper face of the handle adjacent its rear end thereof for preventing slipping of the hand when the scraper is in service.

It is to be understood that I do not wish to be limited to the exact details of construction illustrated and described as obviously changes might be made therein within the purview of this invention.

I claim:

1. A scraper comprising a handle, a blade secured to said handle, said handle being provided with a depression at its forward end the side walls of which function as a deflector.

2. A scraper comprising a handle having a flattened underside, a blade removably secured to said flattened portion, said handle being offset with respect to said blade, a groove in the upper side of said handle, the edges of said groove extending rearwardly and upwardly to form a deflector the upper side of said handle being provided with a resilient insert substantially as described adjacent the rear end of the groove.

This specification signed this 8th day of April, 1922.

JOHN L. SPENCE, JR.